US007071581B2

(12) United States Patent
Eisenhaure et al.

(10) Patent No.: US 7,071,581 B2
(45) Date of Patent: Jul. 4, 2006

(54) UNINTERRUPTIBLE POWER SUPPLY SYSTEM USING A SLIP-RING, WOUND-ROTOR-TYPE INDUCTION MACHINE AND A METHOD FOR FLYWHEEL ENERGY STORAGE

(75) Inventors: David B. Eisenhaure, Cohasset, MA (US); James L. Kirtley, Jr., Brookline, MA (US); Laban Edward Lesster, Severna, MD (US)

(73) Assignee: Satcon Technology Corp., Boston, MA (US)

( * ) Notice: Subject to any disclaimer, the term of this patent is extended or adjusted under 35 U.S.C. 154(b) by 598 days.

(21) Appl. No.: 10/062,982

(22) Filed: Jan. 31, 2002

(65) Prior Publication Data

US 2002/0101119 A1  Aug. 1, 2002

Related U.S. Application Data

(60) Provisional application No. 60/265,216, filed on Jan. 31, 2001.

(51) Int. Cl.
*H02J 7/00*  (2006.01)

(52) U.S. Cl. ............................. 307/64; 307/65; 307/66; 307/67

(58) Field of Classification Search ................. 307/64
See application file for complete search history.

(56) References Cited

U.S. PATENT DOCUMENTS

| | | | |
|---|---|---|---|
| 4,161,680 A | 7/1979 | Akamatsu | 318/722 |
| 4,266,442 A | 5/1981 | Zorzi | |
| 4,388,579 A | 6/1983 | Ellis | 318/732 |
| 4,409,506 A | 10/1983 | Ito et al. | 310/166 |
| 4,464,697 A | 8/1984 | Sun | 361/64 |
| 4,634,888 A | 1/1987 | Deavenport | 307/48 |
| 4,686,375 A * | 8/1987 | Gottfried | 290/2 |
| 4,794,316 A | 12/1988 | Uchino et al. | 322/47 |

(Continued)

FOREIGN PATENT DOCUMENTS

EP   0 917 270   5/1999

OTHER PUBLICATIONS

International Search Report on International Patent Application No. PCT/US02/03155, dated Jul. 31, 2002.

*Primary Examiner*—Robert L. DeBeradinis
(74) *Attorney, Agent, or Firm*—Edward & Angell, LLP; George W. Neuner; George W. Hartnell, III

(57) ABSTRACT

Several embodiments of an uninterruptible power supply (UPS) system, which system provides highly reliable output power to a load using a slip-ring induction machine and a flywheel combination, are disclosed as well as methods relating thereto. In a preferred embodiment, the UPS system comprises a back-up power source, e.g., an engine and generator, and a slip-ring, or wound-rotor, induction motor and flywheel combination, which are in parallel to a primary power source, e.g., a utility grid. During normal operation of the UPS, the primary power source supplies alternating current and voltage to the load and the UPS compensates for voltage drop across the isolating inductor. Moreover, the primary power source keeps the slip-ring induction machine and flywheel in an excited state, i.e., the rotor of the slip-ring induction machine, the shaft of which is shared by the flywheel, is excited above normal synchronous speed. When the primary power source fails, the flywheel, which is rotating at super-synchronous speed and storing kinetic energy, drives the rotor of the slip-ring induction machine and generates, i.e., induces current in the stator. Accordingly, the flywheel and slip-ring induction machine combination provides instantaneous, short term power to the load until the back-up power source has powered up and been brought on line.

21 Claims, 3 Drawing Sheets

U.S. PATENT DOCUMENTS

| | | | |
|---|---|---|---|
| 4,920,293 A | 4/1990 | Kanda | 310/116 |
| 5,057,697 A | 10/1991 | Hammond et al. | 307/66 |
| 5,229,650 A | 7/1993 | Kita et al. | 307/66 |
| 5,646,458 A | 7/1997 | Bowyer et al. | 307/67 |
| 5,729,118 A | 3/1998 | Yanagisawa et al. | 322/29 |
| 5,994,794 A | 11/1999 | Wehrlen | |
| 6,020,657 A | 2/2000 | Liran | |
| 6,023,152 A | 2/2000 | Briest et al. | |
| 6,133,716 A * | 10/2000 | Schutten | 322/40 |
| 6,198,176 B1 * | 3/2001 | Gillette | 307/64 |
| 6,628,012 B1 | 9/2003 | Reuter | 307/68 |

* cited by examiner

UNINTERRUPTIBLE POWER SUPPLY SYSTEM USING A SLIP-RING, WOUND-ROTOR-TYPE INDUCTION MACHINE AND A METHOD FOR FLYWHEEL ENERGY STORAGE

CROSS REFERENCE OR RELATED APPLICATIONS

This application claims the benefit of U.S. Provisional Application No. 60/265,216 filed Jan. 31, 2001.

BACKGROUND OF THE INVENTION

1. Field of the Invention

The present invention relates to power supply systems, and, more particularly to uninterruptible power supply systems that provide highly reliable output power to a load using a slip-ring, wound-rotor type induction machine and flywheel assembly combination and a corresponding method for providing an uninterruptible power supply using the same.

2. Background Art

An uninterruptible power supply ("UPS") system typically comprises a primary power source, e.g., a utility grid, in combination with one or more means for providing standby alternating current ("AC") power in the event of a power failure, dips, sags, and the like of the primary power source. Conventional UPS systems typically comprise a primary power source 20 in combination with an engine 50 and generator 60 system and/or with an energy storage means (not shown). See FIG. 4. However, if a power outage, dip or sag of the primary power source 20 occurs with this arrangement—an event that is totally unpredictable—it takes some small, finite amount time to power up and bring the engine 50/generator 60 on line. While the time needed to bring the engine 50/generator 60 on line can be relatively short, for today's computer driven society, a complete power loss for even a fraction of a second could be catastrophic. Furthermore, power dips and sags can cause motors to trip, disrupting manufacturing processes.

An alternative to an engine 50/generator 60 system as a back-up power source includes using an energy storage device, e.g., a battery 40. Batteries 40 store energy, producing direct current ("DC") and voltage therefrom. Typically, back-up systems that utilize batteries 40 also include (i) a rectifier/converter 100 for rectifying AC current 25 that is provided by the primary power source 20 to DC current 35 and (ii) an inverter 30 for converting DC current 35 and voltage produced by the battery 40 back into an AC current and voltage waveform. See, for example, U.S. Pat. No. 4,634,888 to Deavenport.

Indeed, in practice, batteries 40 produce DC voltage 35 to an inverter 30. The inverter 30 converts DC power into AC power of substantially the same frequency and magnitude. Because batteries 40 enjoy the advantage of an immediate response time, in the event of a power outage, dips or sags of the primary power source 20, a battery-based system can be brought in service instantaneously.

However, there are also several disadvantages to this type of UPS. First, batteries 40 have a finite energy storage capacity. As a result, such a system can provide power only up to the rated storage capacity of the battery 40. If energy demand exceeds the storage capacity of the battery 40, then the demand in excess of the battery storage capacity cannot be met. Accordingly, to provide more energy, a battery 40 with greater energy storage is required. However, battery 40 cost is directly proportional to the stored energy needed. Thus, larger capacity batteries 40 can be prohibitively expensive.

Secondly, batteries 40 still can provide power only for a limited amount of time, which is to say until the battery 40 has drained or, more practically, until the delivered power dips or sags sufficiently to cause motors to trip and the like. Accordingly, yet another power source, e.g., an AC generator and an engine to drive that generator may be required to provide power for longer periods in excess of battery 40 life. Finally, problems can always arise about the storage, maintenance, and life of batteries 40.

An alternative to a battery-based system is an energy storage rotor-, or flywheel, based energy storage system such as those currently being marketed by Beacon Power Corporation of Wilmington, Mass. Flywheel-based energy storage devices comprise relatively simple devices for readily storing and recovering kinetic energy. The flywheel is used in conjunction with an electric motor/generator. Conceptually, as mechanical energy is applied by the rotor of the motor in the flywheel assembly, the flywheel, which is in a tight interference fit with the rotor, spins, storing mechanical kinetic energy.

Most of the kinetic energy of the flywheel assembly is stored in the outermost portion, or rim, of the rotating flywheel. The amount of kinetic energy stored in the flywheel assembly is directly proportional to the inertia and to the square of the rotational velocity of the flywheel. Thus, the thrust of the state of the art is to produce high speed, high capacity flywheels. As the flywheel spins, AC current, and, thus, power, is induced in wires configured and arranged on the stator of the motor/generator for that purpose. However, flywheel assemblies, like batteries, can operate only for a fixed duration, which is to say until the kinetic energy of the flywheel no longer provides sufficient current to power the load.

Therefore, energy storage devices also cannot guarantee fully an uninterruptible power supply. The present invention, however, discloses a UPS system that provides emergency, short-term stored energy using induction-type machines in combination with a flywheel assembly to bridge the gap, i.e., the transition time, between complete failure or short circuit, dips, and/or sags of a primary power source and the start-up and putting on line of a back-up power source.

BRIEF SUMMARY OF THE INVENTION

The present invention makes it is possible to combine energy storage and power conversion using a doubly-fed induction machine in combination with a flywheel assembly. Such a combination provides instantaneous, short-term, emergency AC power to preclude power outage, dips, and/or sags during the transition time, to allow a back-up engine/generator to be powered up and be brought on line.

One embodiment of the present invention provides a system for providing reliable, uninterruptible power to a load, the system comprising:

a primary power source to provide power to the load;

an auxiliary power source, having a start-up time, which replaces the primary power source after the start-up time when the primary power source cannot provide power;

a wound-rotor induction machine, comprising a rotor, having a rotating shaft, rotor windings, a stator, and stator windings; and a flywheel assembly that is disposed on the rotor shaft, storing rotational energy as kinetic energy;

wherein the wound-rotor induction machine and the flywheel assembly are in parallel with the primary power source, to provide instantaneous, short-term power to the load during the start-up time.

Indeed, emergency, short-term AC power can be provided by a wound-rotor, or slip-ring, induction machine, which is also referred to in the art as a doubly-fed machine, and a flywheel assembly that shares the rotor shaft of the doubly-fed machine. During normal operation of the primary power source, secondary, variable frequency AC power is provided to the rotor of the slip-ring induction machine, causing the slip-ring machine and the flywheel assembly to operate, e.g., at super-synchronous speed. Thus, the slip-ring machine remains in an excited state, which means that the slip-ring machine and flywheel assembly combination can produce emergency AC power instantaneously. Moreover, the flywheel of the flywheel assembly, which is rotating initially at, e.g., a super-synchronous speed, can provide mechanical power back to the slip-ring machine. The slip-ring machine then can provide electrical AC power to the load. Once the back-up power source is started up and brought on line, the slip-ring machine and flywheel assembly combination can be returned to super-synchronous speed using power produced by the back-up power source.

A second, more economical, embodiment of the present invention includes connecting the back-up power source, e.g., a diesel engine, to the rotor shaft that is already common to the slip-ring machine and the flywheel assembly. The second embodiment differs from the first described embodiment by the manner in which the back-up power source is started up and brought on line. With this embodiment, the slip-ring induction machine now also can be a generator for the engine. The induction machine "generator" and flywheel assembly are already on line and can be clutched into the diesel engine when the engine comes up to operating speed. This saves the cost of a separate generator and related controls required for power phase synchronization.

The doubly-fed induction motor and flywheel assembly combination, as it has been described, can exhibit poor power quality under certain circumstances, such as a terminal fault, i.e., short circuit, which can cause a primary power source failure. Such a failure could pull down the voltage of the combination system. To obviate this problem, in yet another embodiment, a synchronous motor running from and powered by the utility grid can be added to the system. The synchronous motor would share the common rotor shaft of the doubly-fed induction machine and the flywheel assembly. When the utility grid fails, the initially synchronous spinning flywheel provides mechanical energy to the rotor of the induction machine as it slows down. The induction machine then becomes a generator, providing electrical power to the load. The shaft lineup of this embodiment has the characteristics of a motor/generator set, substantially isolating the load side from the line side.

In yet another embodiment, the present invention provides a method of providing reliable, uninterruptible power to a load, the method comprising the steps of:
providing power to the load by a primary power source;
providing power to the load by an auxiliary power source, having a start-up time, which replaces the primary power source after the start-up time when the primary power source cannot provide power;
providing instantaneous, short-term power to the load by a wound-rotor induction machine, having a rotor, and an energy-storing flywheel assembly that is disposed on the rotor shaft during the start-up time.

Accordingly, the invention in its many embodiments can provide a highly reliable uninterruptible power supply system comprising primary and back-up power sources, and a wound-rotor induction motor and flywheel assembly in combination to bridge the transition time, between failure of, e.g., a utility grid, and the start up and bringing on line of an engine/generator. Furthermore, the present invention accomplishes this end at low cost.

BRIEF DESCRIPTION OF THE DRAWINGS

The invention will be better understood by reference to the following more detailed description and accompanying drawings in which like numbered elements refer to like number elements.

DETAILED DESCRIPTION OF THE INVENTION AND PREFERRED EMBODIMENTS THEREOF

Figure 1:
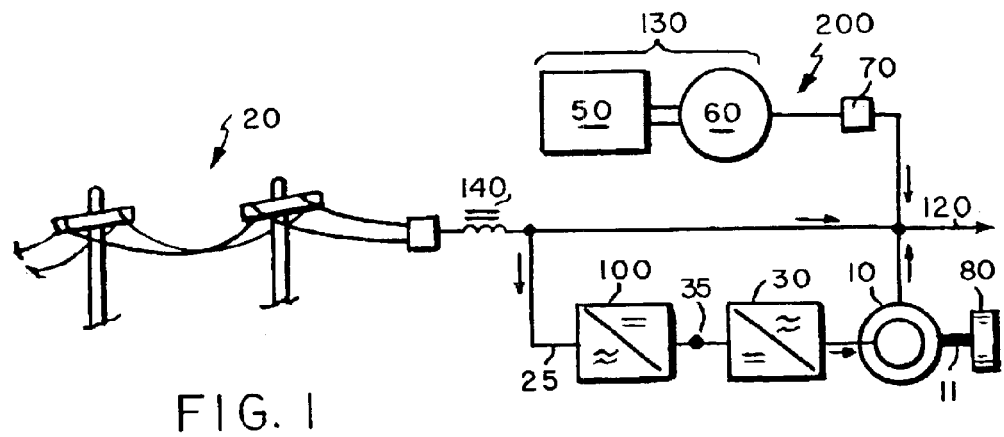
FIG. 1 is an illustrative example of an alternate embodiment of a UPS in accordance with the present invention.

A first embodiment of a UPS system 200 in accordance with this invention is shown illustratively in FIG. 1. The embodied system 200 comprises three major components: a back-up power source 130, which, for illustrative purposes only, is shown as an engine 50 and generator 60; a slip-ring, or wound-rotor induction machine 10 and flywheel assembly 80 in combination, and a primary power source 20, e.g., a utility grid. As shown, the three components of the system 20 are in parallel. The primary power source 20 supplies alternating current ("AC") and voltage (power) to the load 120 during normal operation. "Normal operation" is defined herein as referring to those periods of operation during which the primary power source 20 is providing power to the load 120 without any sags or dips of sufficient magnitude as to cause, e.g., motors to trip or computers to shutdown.

If and when the primary power source 20 fails, which is to say that power levels dip or sag below normal operation levels, the slip-ring machine 10 and flywheel assembly 80 combination provides instantaneous, short-term power to the load 120 until such time as the back-up power source 130 has powered up and been brought on line. The flywheel assembly 80 can be configured and arranged so that flywheel rotor is disposed on the rotor shaft 15 of the slip-ring machine 10. The slip-ring machine 10 can be maintained in a ready state to deliver power to the load 120 until the back-up generator 60 of the back-up power source 130 can be brought on line.

The back-up power source 130 includes a circuit breaker 70, circuits, a controlling means, and software for controlling the circuit breaker 70, which automatically determines the phasing of the generator 60 and the load 120 once the generator 60 has been started. Once the generator 60 is in phase with the load 120, the circuit breaker 70 can bring the generator 60 on line to provide power to the load 120.

Preferably, the flywheel assembly 80 of the present invention is of a high-speed-type and manufacture that are well known to the art. For example, Beacon Power Corporation of Wilmington, Mass. can produce a high-speed, graphite composite flywheel that can operate at about 25,000 revolutions per minute ("RPM"), which produces about 6 kilo Watt-hours of energy. The present invention, however, also can be practiced using low-speed, steel wheel-type flywheel assemblies 80, which can operate at about 1,800 RPM.

More preferably, when high-speed, composite flywheel assemblies 80 are used, a gear reducer (not shown) is also used to synchronize the speed of the rotating flywheel with the speed of the induction motor rotor 11. The gear reducer can be disposed between the induction machine 10 and the flywheel assembly 80.

Figure 6:
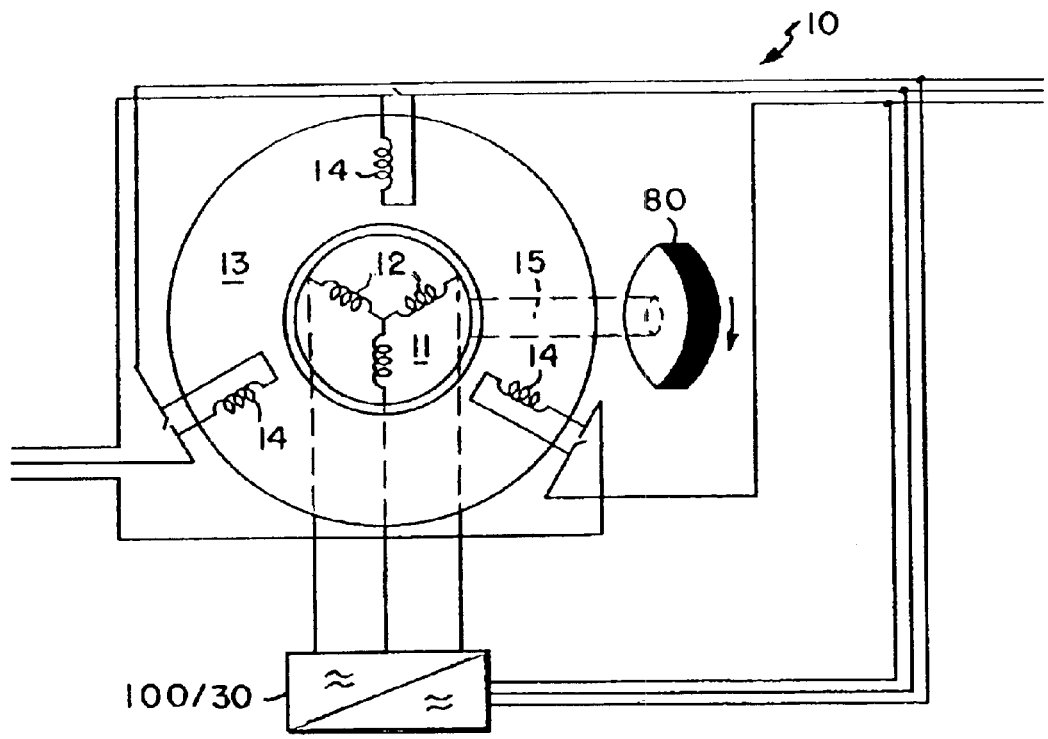
FIG. 6 is a diagrammatic of an illustrative example of a wound-rotor induction machine.

Before discussing in detail the slip-ring induction machine 10 and flywheel assembly 80 combination of the present invention a general discussion of induction machines follows. Referring to FIG. 6, an induction machine 10 comprises a rotor 11, which includes a plurality of windings 12, and a stator 13, which also includes a plurality of windings 14. When the induction machine 10 converts electrical energy into mechanical energy, the machine 10 is referred to as a motor. Alternatively, when the induction machine 10 converts mechanical energy into electrical energy, the machine 10 is referred to as a generator.

Induction motors 10, e.g., of the wound-rotor- or squirrel cage-type, can produce mechanical power by generating a rotating magnetic field about the stator windings 14. The magnetic field induces current flow in the rotor windings 12. The interaction of the current and magnetic field causes the rotor 11 to produce torque and rotate, ultimately rotating at approximately the same speed as the revolving magnetic field. The shaft 15 of the rotating rotor 11 provides mechanical power. The current and frequencies supplied to the stator windings 14 can be used to control or regulate the mechanical torque and the speed of the rotor 11. Induction generators work basically in just the opposite manner. As the rotor 11 rotates, the rotor windings 12 induce AC current in the stator windings 14, which current (power) can be output to a load 120.

Slip-ring machines 10 also are referred to as doubly-fed machines because electricity can be fed into or induced in two sets of conventional electrical windings: the rotor windings 12 and stator windings 14. Each set of windings 12 and 14 handles an amount of power proportional to the mechanical power, but in proportion to their electrical frequencies. Stator windings 14 and rotor windings 12 can be similar. Indeed, both winding types 12 and 14 can be multi-phase and both can be balanced. However, the frequencies of the voltage of the rotor windings 12 and of the stator windings 14 differ by the rotational speed of the machine 10 in relation to synchronous speed, which is to say that the frequencies seen by the windings 12 and 14 are scaled by the rotation of the machine 10. Accordingly, voltage (and power) is proportional to the electrical frequency of each winding 12 and 14.

The rate at which rotor 11 speed decreases is determined by the load power being supplied in relation to the amount of kinetic energy that is stored in the rotor 11. Recalling that flywheels (not shown) store rotational energy as kinetic energy, application of a flywheel of the flywheel assembly 80 to the rotor shaft 15 of an induction machine 10 provides an effective system 200.

In accordance with several embodiments of the present invention, a flywheel assembly 80 is configured relative to the induction machine 10 to share a common rotor shaft 15. Hence, during normal, non-emergency operation, the flywheel of the flywheel assembly 80 can be driven, e.g., at super-synchronous speeds, by the rotor shaft 15 of the induction machine 10, storing up kinetic energy. Under emergency conditions, i.e., when the primary power source 20 fails, the kinetic energy stored in the flywheel of the flywheel assembly 80 can be used to drive the rotor 11, which induces current in the stator 13, which current becomes useable power for the load 120.

With the induction machine 10 and flywheel assembly 80 combination, a relationship exists between energy conversion, i.e., the conversion of mechanical power into electrical power, or vice versa, and power (electrical or mechanical) flow. When the machine 10 operates at a frequency, or speed, greater than normal synchronous speed, i.e., super-synchronous, which is to say that the speed of the machine's rotor 11 exceeds the synchronous speed of the rotating magnetic field due to the machine's stator 13, the machine 10 can act as a motor, converting electrical power to mechanical power, by actively injecting power at a specific frequency from the power electronics module 30 into the rotor 11. For the same, super-synchronous frequency, the machine 10 can act as a generator by actively withdrawing power from the rotor 11.

If, on the other hand, the machine 10 operates at a frequency, or speed, less than normal synchronous, i.e., sub-synchronous, which is to say that the synchronous speed of the rotating stator 13 magnetic field exceeds the speed of the rotor 11 of the machine 10, the machine 10 can act as a generator by actively injecting power at a specific frequency from the power electronics module 30 into the rotor 11. For the same, sub-synchronous frequency, the rotor 11 of the machine 10 can act like a motor by actively withdrawing power at a specific frequency from the rotor 11.

Preferably, in operation, the rotor 11 can be excited at relatively low frequency and, more preferably, DC power can be used with an inverter 30 to feed the rotor 11 of the slip-ring machine 10. The inverter 30, i.e., the power electronics, that provides AC current to the rotor winding 12 can be controlled by software and, further, can be programmed to ensure that the desired output voltage (power) and frequency from the inverter 30 are correct. To produce the minimum rating for the power electronics 30, the slip-ring machine 10 is operated at a speed approximately between a speed above synchronous speed and a sub-synchronous speed equally below synchronous speed.

As a result, in super-synchronous generator mode, the power electronics, e.g., the inverter 30, initially can withdraw power from the rotor 11. However, such power decreases with time and eventually goes to zero as speed approaches normal synchronous speed. At this point, the power electronics 30 can begin to source external power to the rotor 11. This power to and from the rotor 11 can be circulated through the AC system; however, in an alternate embodiment it can be more advantageous, in terms of ease of control, to have some energy storage, e.g., a battery or capacitor (not shown), to support the DC link 35 of the inverter 30.

When an induction machine 10 is used in combination with a flywheel assembly 80, the deviation of rotor 11 speed relative to its normal synchronous speed can be considerable. Indeed, rotor 11 speed deviation can be on the order of about 20 percent during recovery of rotor 11 kinetic energy.

To minimize the rating of the rotor windings 12 and the power conversion electronics 30, which drive the windings 12, and therefore optimize cost, two alternatives are possible. First, as the rotor 11 is driven above normal motoring slip speed to synchronous speed and the in-motoring-mode machine 10 is then placed in generator mode, power flows only into the rotor 11 circuit from the external electronics 30, i.e., unidirectionally. As a result, a 20 percent speed deviation corresponds to about 20 percent of delivered power for a single unidirectional inverter 30. However, the rotor 11 must have a 20 percent power rating.

Second, as the rotor 11 is driven above normal synchronous speed to a value that is one-half of the speed change required to recover the required energy at constant power, energy recovery starts at this high rotor speed and continues as the rotor 11 speed declines until that speed is about one-half of the required speed change below the normal motoring slip value. Moreover, while operating above the synchronous speed in generator mode, power is withdrawn from the machine 10. Withdrawn power declines steadily to zero, which occurs at normal synchronous speed.

Below normal synchronous speed in generator mode, power from the inverter 30 is injected into the rotor 11. Thus, injected power increases from zero at normal synchronous speed to a higher value at the lowest speed. Power flow in the rotor 11 and power electronics 30 driving the rotor 11, in this case, is now bidirectional requiring two converters. Further, the maximum value is about one-half of the value of the unidirectional power flow approach above, i.e., a 20 percent speed deviation amounts to about ten percent of delivered power for each of the converters 100/inverters 30, or about one-half of the previous solution and, moreover, the rotor 11 sees only 10 percent rated power in each direction.

A second, more economical, embodiment of the present invention includes configuring and arranging the back-up, e.g., diesel engine 50 on the rotor shaft 15 common to the slip-ring machine 10 and the flywheel assembly 80 and, further, providing a clutch 90 to engage and disengage the engine 50. See FIG. 2. Most of the elements comprising this embodiment have been described previously and will not be described again except as they impact and interact with the back-up engine 50 on the common rotor shaft 15.

During normal, non-emergency, operation, the primary power source 20 provides AC power to the load 120 via a series isolating inductor 140, of a type well known to the art, and also to the stator 13 and, via a rectifier 100/inverter 30 arrangement, to the rotor 11 of the slip-ring machine 10 through a rectifier 100/inverter 30 arrangement. The clutch 90 to the back-up engine 50 is not engaged during normal operation. As with the previous embodiment, the common shaft 15 of the rotor 11 and flywheel assembly 80 can be kept at super-synchronous speed. Thus, for emergency conditions, the slip-ring machine 10 already can be in an excited state. The stored kinetic energy from the flywheel assembly 80 can be used to generate output power to the load 120 from the stator 13.

Preferably, in this embodiment, a clutch 90 can engage the engine 50 to the common rotor shaft 15 when the engine 50 is fully operational. This embodiment can be more economical because it effectively eliminates the need for a separate generator 60 and controls 70 required to synchronize the phase of the load 120 with the phase of the generator 60 since the induction machine output is already synchronized. Precision of this clutching operation is not difficult if there is a substantial inertia in the flywheel of the flywheel assembly 80. In fact, flywheel assemblies 80 with substantially stored amounts of kinetic energy can be used to start the engine 50 by engaging, or "popping", the clutch 90, as is frequently done with standard transmission automobiles whose batteries have drained. Correspondingly, the attendant change in speed of the rotor 11 can be compensated for automatically by a change in frequency from the inverter 30 supplying current to the rotor 11.

The systems 200 that have been described in the previous two embodiments can exhibit poor power quality under certain circumstances such as when a terminal fault, i.e., short circuit, causes primary power source 20 failure. For example, if the short circuit is heavy enough, it can drag down the voltage (and power) that the slip-ring machine 10 supplies to the load 120. To obviate this problem, in yet another embodiment, the rotor 11 of the slip-ring induction machine 10 can be driven by a flywheel assembly 80 and a separate synchronous motor 110 that is configured and arranged on the rotor shaft 15 common to the flywheel assembly 80 and induction machine 10. See FIG. 3. This embodied system substantially isolates the load side 120 from the line side 20.

According to this embodiment, under emergency conditions, i.e., if and when the primary power source 20 fails, the slip-ring induction machine 10 already can be in an excited state. Furthermore, the synchronous motor 110 and flywheel assembly 80 are rotating on the common rotor 11 shaft at or below normal synchronous speed. The flywheel assembly 80 and motor 110 can provide mechanical power to the rotor 11 of the slip-ring induction machine 10, which can deliver power to the load 120 through the stator 11. Injected power from the inverter 30 to the slip-ring machine 10 can make up the slip frequency to maintain 60 Hz output.

The motor 110 for this embodiment can be, e.g., a synchronous machine or a squirrel-cage induction machine. Because the motor 110 is synchronous or runs just sub-synchronous, the motor 110 and flywheel assembly 80 initially operate at normal synchronous speed instead of super-synchronous speed as was the case with the first two embodiments. This embodied system 200 provides very high quality electric power, but is more expensive than the two embodiment described above because of the additional cost of the synchronous motor 110.

Figure 2:
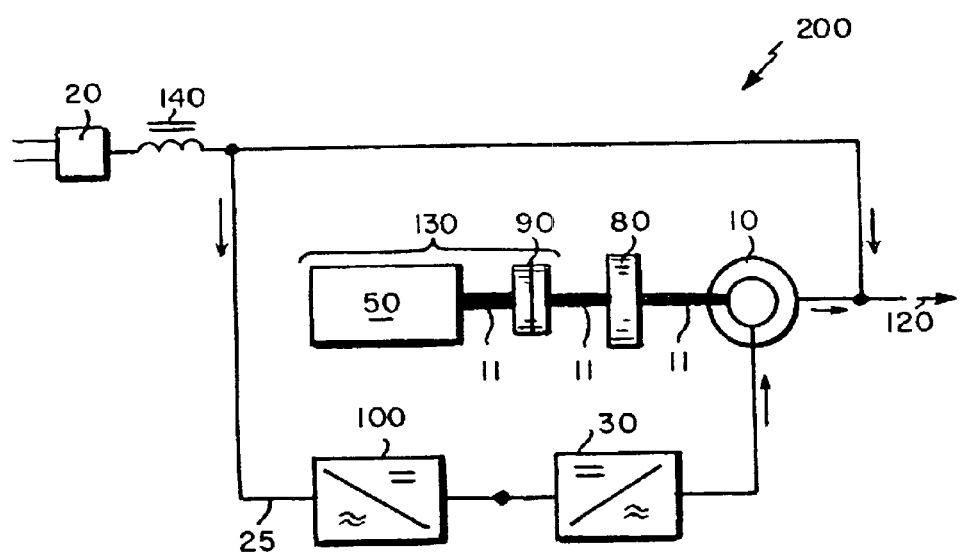
FIG. 2 is an illustrative example of a preferred embodiment of a UPS using a diesel engine and a clutching system in accordance with the present invention.
Figure 3:
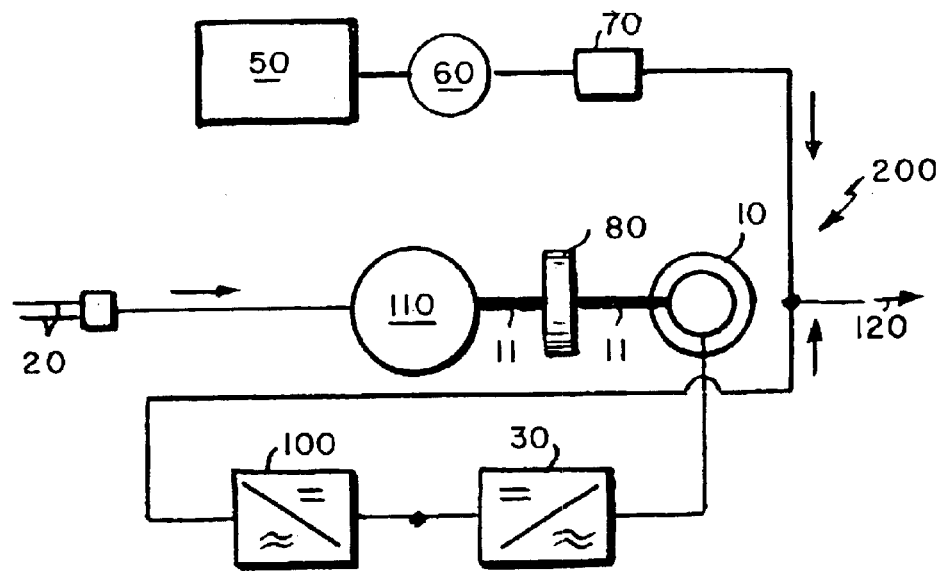
FIG. 3 is an illustrative example of an alternative embodiment of a UPS using a synchronous motor in accordance with the present invention.
Figure 4:
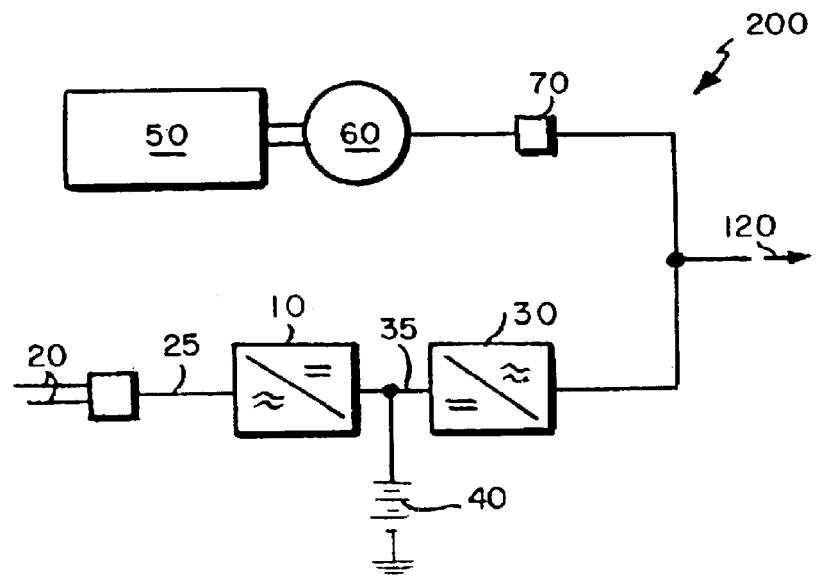
FIG. 4 is an illustrative example of a prior art uninterruptible power supply system.
Figure 5:
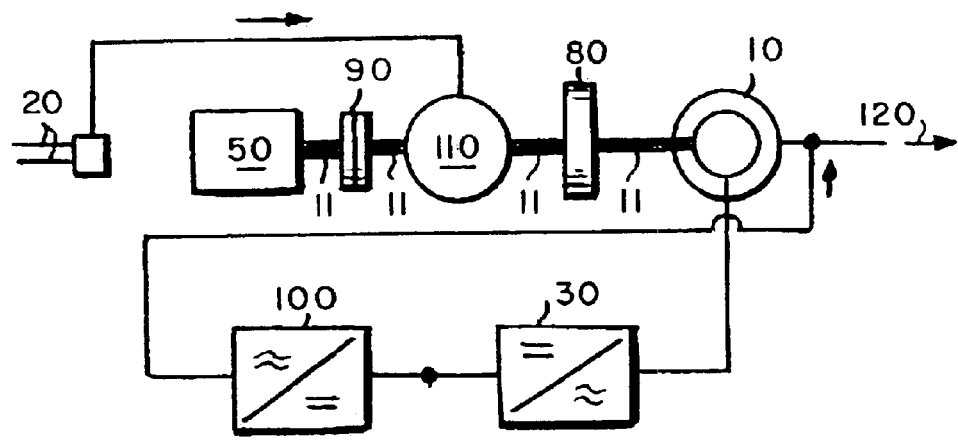
FIG. 5 is an illustrative example of an alternative embodiment using a synchronous motor and a diesel engine and a clutching system in accordance with the present invention.

In yet another embodiment of the present invention, it is possible to combine the features illustrated by FIGS. 2 and 3, i.e., including in the shaft line: a synchronous motor 110, a flywheel assembly 80, a slip-ring induction machine 10, and an engine 50, which can be connected to the shaft 15 line by a clutch 90. See FIG. 5. According to this embodiment of the invention, as with the last embodiment described, if and when the primary power source 20 fails, the slip-ring induction machine 10 can be in an excited state, however, the flywheel assembly 80 and synchronous motor 50 are rotating at or below normal synchronous speed. Injected power from the inverter 30 to the slip-ring machine 10 can make up the frequency difference to maintain 60 Hz output.

Once the engine 50 is operational, the clutch 90 can engage the, e.g., diesel, engine 50 to the rotor shaft 15 automatically. Precision of this clutching operation is not difficult if there is substantial inertia in the flywheel of the flywheel assembly 80. Correspondingly, any transient attendant change in speed of the rotor 11 is matched by an increase in frequency from the inverter 30 supplying current to the rotor 11.

Having described several embodiments of systems 200 for providing uninterruptible power to a load, we will now describe an embodiment of a method of providing reliable, uninterruptible power to a load. Preferably, the method comprises the steps of providing power to the load using a primary power source, e.g., a utility grid; providing back-up power to the load using an auxiliary power source, which is in parallel with said primary power source, when the primary power source can no longer deliver sufficient power to the load; and providing instantaneous, short-term power to the load during the transition between failure of the primary power source and start-up of the secondary power source. More preferably, the method includes providing instantaneous, short-term power to the load using a wound-rotor induction machine, of a type previously described, in combination with an energy-storing flywheel assembly, of a type previously described, that is disposed on the shaft of the rotor of the wound-rotor induction machine.

According to the preferred embodiment of the method, short-term power can be provided to the load using kinetic energy that is stored in the flywheel assembly, which is rotating at, e.g., super-synchronous speed. Indeed, the preferred method includes operating the wound-rotor induction machine at a frequency between a super-synchronous frequency and a sub-synchronous frequency, such that the sub-synchronous frequency is below the synchronous frequency by the same amount as the super-synchronous frequency exceeds the same synchronous frequency.

In another embodiment, the step of providing instantaneous, short-term power can include the sub-step of using the primary power source to drive the wound-rotor induction machine electrically, or alternately, using an off-line power source, e.g., a synchronous motor, to drive the wound-rotor induction machine mechanically.

Although the present invention has been as described in detail with reference to its preferred embodiments, it should be readily apparent to those skilled in the art that changes and modifications in form and details can be made without departing from the scope and spirit of this disclosure.

For example, a separate vacuum pump (not shown) can be configured and arranged with respect to the flywheel assembly 80 to evacuate the interior of the flywheel assembly 80 further to reduce friction losses of the flywheel due to air drag.

Additionally, the embodied systems 200 described can be used to provide mechanical output rather than electrical output. Accordingly, the shaft 15 of the doubly-fed machine 10 can be configured and arranged with respect to, e.g., a hydraulic motor, pump, and the like, industrial machinery, and/or heavy construction equipment.

What is claimed is:

1. A system for providing reliable, uninterruptible power to an electrical load, the system comprising:
    a primary power source to provide electrical power to said load;
    a wound-rotor induction machine, comprising a rotor, having a rotating shaft, rotor windings, a stator, and stator windings;
    an auxiliary power source having a start-up time to provide mechanical power to the shaft of the wound-rotor induction machine after said start-up time when said primary power source cannot provide power;
    means for exciting the rotor windings with a current to provide constant frequency to the electrical load as the rotating shaft speed varies; and
    a flywheel assembly that is disposed on said rotor shaft, storing rotational energy as kinetic energy;
wherein said wound-rotor induction machine and said flywheel assembly provide instantaneous, short-term power to said electrical load in the event of failure of the primary power source, during said start-up time.

2. A system as recited in claim 1, wherein the primary power source is a utility grid.

3. A system as recited in claim 2, wherein the exciting means further comprises means for synchronizing load phases with the utility grid.

4. A system as recited in claim 1, wherein the auxiliary power source comprises an engine and an engaging and disengaging in means for connecting the engine to the shaft of the wound-rotor induction machine.

5. A system as recited in claim 1, wherein the rotating shaft speed varies between super-synchronous and sub-synchronous.

6. A system as recited in claim 1, wherein the rotor windings have a first frequency and the rotor shaft has a speed that is proportional to a second frequency, which frequencies are scaled to provide a constant electrical frequency in the machine stator windings.

7. A system as recited in claim 6, wherein the wound-rotor induction machine operates at a shaft speed between a super-synchronous frequency and a sub-synchronous frequency, wherein said sub-synchronous shaft speed is below the synchronous frequency by the same amount as the super-synchronous shaft speed exceeds said synchronous frequency.

8. A system as recited in claim 7, wherein the wound-rotor induction machine, operating at sub-synchronous frequency, comprises at least one of a motor that draws power from the rotor and a generator that injects power into the rotor.

9. A system as recited in claim 1, the system further comprising energy storage means to inject power into the rotor shaft.

10. A system as recited in claim 1, wherein the engaging and disengaging means comprises a clutch mechanism.

11. A system as recited in claim 1, wherein the auxiliary power source is a diesel engine.

12. A system as recited in claim 1, wherein the wound-rotor induction motor is powered electrically by the primary power source.

13. A system as recited in claim 1, wherein the wound-rotor induction motor is powered mechanically by an off-line power source.

14. A system as recited in claim 1 wherein the current for exciting the rotor windings has a frequency that is adjustable.

15. A system as recited in claim 1 wherein the current for exciting the rotor windings has a magnitude that is adjustable.

16. A method of providing reliable, uninterruptible power to a load, the method comprising the steps of:
    providing power to said load using a primary electric power source;
    providing instantaneous, short-term power to said load during a start-up time using a wound-rotor induction machine, having a rotor, in combination with an energy-storing flywheel assembly that is disposed on a shaft of said rotor;
    exciting the rotor windings with a current to provide a variable speed to the rotating shaft; and
    providing power to said load by driving the shaft of the wound-rotor induction machine using an auxiliary mechanical power source having a start-up time, which replaces said primary power source, after said start-up time when said primary power source cannot provide power.

17. A method as recited in claim 16, wherein instantaneous, short-term power to said load is provided by kinetic energy stored in the flywheel assembly, which energy drives the rotor.

18. A method as recited in claim 16, wherein the step of providing instantaneous, short term power comprises operating the wound-rotor induction machine at a shaft speed between a super-synchronous frequency and a sub-synchronous frequency, wherein said sub-synchronous shaft speed is below the synchronous frequency by the same amount as the super-synchronous shaft speed exceeds said synchronous frequency; and wherein a variable frequency and magnitude current source are provided to generate constant frequency electric power in the stator of the wound-rotor induction machine.

19. A method as recited in claim 16, wherein the step of providing power to the load using the auxiliary mechanical power source is adapted to couple to the shaft of the wound-rotor induction machine through a clutch that engages after the start up time.

20. A method as recited in claim 19, wherein the step of providing power to the load using the auxiliary mechanical power source, having a first speed, engages the auxiliary mechanical power source to the shaft of the wound-rotor induction machine, having a second speed, when the first speed is equal to the second speed to allow rapid acceleration.

21. A system for providing mechanical output to a load, the system comprising:

a wound-rotor induction machine, comprising a rotor, having a rotating shaft, rotor windings, a stator, and stator windings;

means for exciting the rotor windings with a current to provide a variable speed to the rotating shaft;

a primary power source to provide power to said induction machine;

an auxiliary power source having a start-up time to provide power to said induction machine after said start-up time when said primary power source cannot provide power; and a flywheel assembly that is disposed on said rotor shaft, storing rotational energy as kinetic energy;

wherein said flywheel assembly provides instantaneous, short-term mechanical power to said induction machine during said start-up time.

* * * * *

UNITED STATES PATENT AND TRADEMARK OFFICE
CERTIFICATE OF CORRECTION

PATENT NO. : 7,071,581 B2 Page 1 of 1
APPLICATION NO. : 10/062982
DATED : July 4, 2006
INVENTOR(S) : David B. Eisenhaure et al.

It is certified that error appears in the above-identified patent and that said Letters Patent is hereby corrected as shown below:

Column 10, claim 4, line 10, "disengaging in means" should read --disengaging means--.

Signed and Sealed this

Eighteenth Day of March, 2008

JON W. DUDAS
*Director of the United States Patent and Trademark Office*